United States Patent
Köhler et al.

(10) Patent No.: US 9,243,336 B2
(45) Date of Patent: Jan. 26, 2016

(54) PROCESS FOR THE MANUFACTURE OF CONTACT STRIPS FOR ELECTROLYZERS

(75) Inventors: Steffen Köhler, Halle/Saale (DE); Hans-Jürgen Kunz, Dortmund (DE); Karl Heinz Dulle, Olfen (DE); Peter Woltering, Neuenkirchen (DE); Heinz Sibum, Essen (DE)

(73) Assignee: THYSSENKRUPP UHDE CHLORINE ENGINEERS (ITALIA) S.R.L, Milan (IT)

( * ) Notice: Subject to any disclaimer, the term of this patent is extended or adjusted under 35 U.S.C. 154(b) by 0 days.

(21) Appl. No.: 12/448,191

(22) PCT Filed: Jan. 30, 2008

(86) PCT No.: PCT/EP2008/051158
§ 371 (c)(1),
(2), (4) Date: Jul. 20, 2009

(87) PCT Pub. No.: WO2008/092914
PCT Pub. Date: Aug. 7, 2008

(65) Prior Publication Data
US 2010/0012707 A1    Jan. 21, 2010

(30) Foreign Application Priority Data
Feb. 1, 2007  (DE) .......................... 10 2007 005 036

(51) Int. Cl.
*B23K 31/00* (2006.01)
*C25B 9/04* (2006.01)
*B32B 37/10* (2006.01)

(52) U.S. Cl.
CPC ................. *C25B 9/045* (2013.01); *B32B 37/10* (2013.01)

(58) Field of Classification Search
CPC .......... C25B 9/045; C25B 9/066; C25B 9/08; C25B 9/18; C25B 9/206; H01H 11/041; B23K 20/001; B23K 20/04
USPC ..................... 228/265, 17, 115, 3.1
See application file for complete search history.

(56) References Cited

U.S. PATENT DOCUMENTS

| 3,858,785 A | * | 1/1975 | McLain .......................... 228/17 |
| 4,642,891 A | * | 2/1987 | Weik et al. ...................... 29/879 |
| 5,019,224 A | * | 5/1991 | Denton et al. ................. 205/300 |
| 5,761,799 A | | 6/1998 | Mennucci |
| 6,722,002 B1 | | 4/2004 | Chang |

FOREIGN PATENT DOCUMENTS

| DE | 42 41 433 A1 | 6/1994 | |
| GB | 867994 | 5/1961 | |
| GB | 2 073 253 | * 10/1981 | |
| JP | 63093835 A | * 4/1988 | ............... C22C 9/00 |
| WO | WO 01/85388 | * 11/2001 | |
| WO | WO 01/85388 A1 | 11/2001 | |

OTHER PUBLICATIONS

Machine Translation of WO 2001/85388.*

* cited by examiner

*Primary Examiner* — Aaron Austin
*Assistant Examiner* — Megha Mehta
(74) *Attorney, Agent, or Firm* — Lucas & Mercanti LLP

(57) ABSTRACT

In the case of a process for the manufacture of contact strips, in particular for electrolyzers (membrane cells), the objective is to provide a solution that allows to create a cheap but also extremely efficient method for the manufacture of such contact strips at a high electrical efficiency. This objective is achieved by applying the roll bonding method to attach a copper strip to a titanium strip.

9 Claims, 1 Drawing Sheet

PROCESS FOR THE MANUFACTURE OF CONTACT STRIPS FOR ELECTROLYZERS

Figure 1:
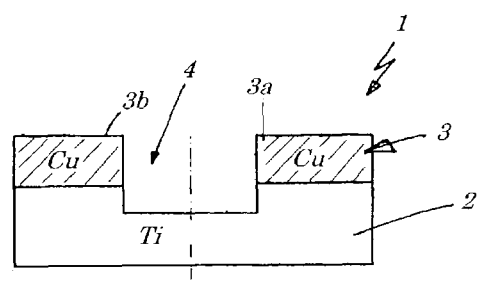

This application is a 371 of PCT/EP2008/051158 filed Jan. 30, 2008

The invention relates to a process for the manufacture of contact strips, in particular for electrolysers (membrane cells).

Such electrolysis cells are, for example, described in applicant's document WO 98/15675 A1. Contact strips are especially required to establish electrical contact between adjacent electrolysers. Various methods are available for the manufacture of such contact strips and for their attachment to the cell walls.

Applicant's document WO 01/85388 A1 describes the manufacture of such contact strips, too. In this case, a laser pressure-welding procedure is used to weld contact strips of material with good electrical conductivity to titanium sheet strips.

In case sheet strips are connected to items of dissimilar materials, a known practice is to use explosion-bonding methods. The said method uses material that is bonded to the carrier base material at high speed by igniting explosive material so that grid-type metal bonding is obtained between the two materials. This procedure, however, is comparatively sophisticated and expensive.

The objective of the invention is to provide a cheap but also extremely efficient method which permits the manufacture of such contact strips at a high electrical efficiency.

The objective of the invention is achieved by implementing a process of the type described above and thereby attaching a copper strip to a titanium strip, using the roll bonding method.

It was surprising to find that an attachment of a titanium strip on the one side, to a copper strip on the other, by the method recommended in this invention was easily feasible, the high pressure exerted by the rollers on the contact surfaces of the metal thus destroying or removing any oxide layers and improving the electrical conductivity.

Embodiments of this invention are described in the sub-claims, a benefit achievable in this case being a cold forming rate of 60 to 80% in a first step of the roll bonding process.

A further embodiment of the process in accordance with the invention provides for the use of an untreated titanium strip in combination with a cleaned Cu strip in the roll bonding process, in particular a cleaned SeCu strip. A typical semi-finished strip of titanium, such as "TIKRUTAN®" manufactured by Messrs. Krupp, is suitable for this purpose.

A further embodiment can be implemented in such a manner that the titanium strip and/or copper strip are brushed on the bonding side prior to feeding them to the machine. An enhanced embodiment of the invention provides for a brushing of the respective strip in a longitudinal direction to the rolling operation.

The invention also provides for a rolling pressure of 780 t per 200 mm width at xy mm length when performing the roll bonding process.

It was also found that the copper strip can act as an intermediate layer between nickel and titanium so that a three-metal strip can be formed in accordance with the invention, i.e. a nickel strip being attached to the copper strip by the said roll bonding method, which also permits a synchronous bonding of the three strips.

Figure 2:
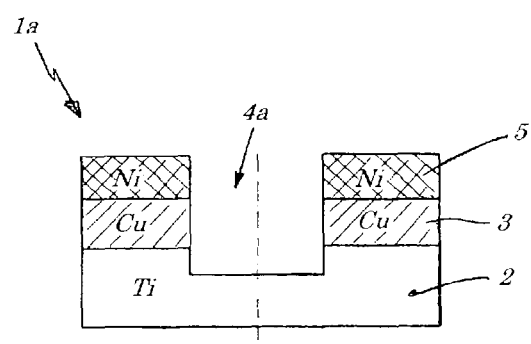

Further features, characteristics and benefits of the invention are described below and illustrated by the drawings listed below:

FIGS. 1 and 2 show a simplified cross-sectional view of the contact strips manufactured in accordance with the invention.

In the case of FIG. 1, contact strip 1 consists of titanium strip 2 and copper strip 3 which is attached to titanium strip 2 by the roll bonding method.

In order to form two contact webs 3a and 3b, it is possible to remove, for example by machining, the centre part in particular of the copper strip in such a manner that longitudinal groove 4 is obtained.

FIG. 2 illustrates the possibility of providing contact strip 1a with copper strip 3 as intermediate layer between titanium strip 2 and nickel strip 5, the latter being additionally attached to the structure. In this case, a longitudinal centre groove 4a is provided, too.

A typical contact strip manufacture is described below in more detail:

Material: TIKRUTAN® 12 titanium strip, dimensions 200×3.5 mm, cleaned, copper strip SeCu, dimensions 200×2.88 mm, pre-rolled at a 40% forming rate. Resulting sheet thickness of 6.38 mm on machine feed side; titanium and copper materials being brushed on the bonding side in a longitudinal direction to the rolling operation prior to feeding them to the machine.

Machine parameters: advance speed of 3 m/min., rolling pressure approx. 780 t.

A roll-bonded cladding structure of 2.05 mm was obtained, the cold forming rate amounting to approximately 68%. The envisaged bimetal strength of 1.60 mm could be finish-rolled in one pass. The subsequent cutting of a 7.0 mm width and the bending test did not cause any delamination of the roll-bonded strips of the composite metal structure.

The twisting test (twisting ratio of 1:8× to and fro, twisting ratio of 2:8× in one direction) did not cause any visible component delamination.

The invention claimed is:

1. A process for the manufacture of contact strip for membrane electrolyzers consisting of nickel, copper and titanium comprising:
   attaching a copper strip to a titanium strip by roll bonding process to obtain a copper-titanium contact strip for membrane electrolyzers while destroying or removing oxide layers;
   roll bonding a nickel strip to said copper-titanium strip to obtain a nickel-copper-titanium strip with the copper strip as an intermediate layer; and
   providing only a single longitudinal groove in a central part of said nickel-copper-titanium contact strip by mechanical machining to remove the central part of said contact strip to form two contact webs and exposing a titanium surface of said titanium strip,
   wherein the contact webs comprise nickel and copper; and
   wherein in a first step of said roll boding process, a cold forming rate of 60 to 80% is performed, thereby obtaining a contact strip for membrane electrolyzers consisting of nickel, copper and titanium.

2. The process according to claim 1 wherein said titanium strip is an untreated titanium strip and said copper strip is a cleaned copper strip.

3. The process according to claim 1 wherein said titanium strip and/or said copper strip is subjected to brushing on the bonding side prior to said roll bonding.

4. The process according to claim 3 wherein said brushing is effected in the longitudinal direction to the rolling operation.

5. A method of establishing electrical contact between adjacent membrane electrolyzers, said method comprising:
   obtaining a contact strip for membrane electrolyzers consisting of nickel, copper and titanium by attaching a copper strip to a titanium strip by a roll bonding process while destroying or removing oxide layers, roll bonding a nickel strip to said copper-titanium strip to obtain a nickel-copper-titanium strip with the copper strip as an intermediate layer, and providing only a single longitudinal groove in a central part of said nickel-copper-titanium contact strip by mechanical machining to remove the central part of said contact strip to form two contact webs and exposing a titanium surface of said titanium strip; and establishing said electrical contact between adjacent membrane electrolyzers via said contact strip, wherein the contact webs comprise copper and wherein in a first step of said roll bonding process, a cold forming rate of 60 to 80% is performed.

6. The method according to claim 5 wherein said titanium strip is an untreated titanium strip and said copper strip is a cleaned copper strip.

7. The method according to claim 5 wherein said titanium strip and/or said copper strip is subjected to brushing on the bonding side prior to said roll bonding.

8. The method according to claim 7 wherein said brushing is effected in the longitudinal direction to the rolling operation.

9. The method according to claim 5 wherein a longitudinal groove is provided in a central part of said contact strip to form two contact webs.

* * * * *